United States Patent
Gong et al.

(10) Patent No.: US 11,290,843 B2
(45) Date of Patent: Mar. 29, 2022

(54) METHOD FOR MEASURING SENSING RANGE OF VEHICLE, DEVICE AND MEDIUM

(71) Applicant: BEIJING BAIDU NETCOM SCIENCE AND TECHNOLOGY CO., LTD., Beijing (CN)

(72) Inventors: Guohao Gong, Beijing (CN); Junping Wang, Beijing (CN); Tiankun Zhao, Beijing (CN); Dongchao Gao, Beijing (CN); Zelin Wu, Beijing (CN); Chengfa Wang, Beijing (CN); Yongyi Sun, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/918,496

(22) Filed: Jul. 1, 2020

(65) Prior Publication Data

US 2021/0099831 A1 Apr. 1, 2021

(30) Foreign Application Priority Data

Sep. 30, 2019 (CN) .......................... 201910944409.1

(51) Int. Cl.
*H04W 4/02* (2018.01)
*H04W 4/44* (2018.01)
(Continued)

(52) U.S. Cl.
CPC ............. *H04W 4/023* (2013.01); *G01S 11/02* (2013.01); *G08G 1/0962* (2013.01); *H04W 4/44* (2018.02)

(58) Field of Classification Search
CPC ...... H04W 4/023; H04W 4/44; G08G 1/0962; G01S 11/02
See application file for complete search history.

(56) References Cited

U.S. PATENT DOCUMENTS

2017/0299689 A1* 10/2017 Va .............................. G01S 1/68
2018/0290652 A1* 10/2018 Kindo ............... B60W 50/0097
(Continued)

FOREIGN PATENT DOCUMENTS

JP   2017191098 A   10/2017
JP   2018180735 A   11/2018
(Continued)

OTHER PUBLICATIONS

European Patent Application No. 20165871.3, extended Search and Opinion dated Feb. 18, 2021, 8 pages.
(Continued)

*Primary Examiner* — Muthuswamy G Manoharan
(74) *Attorney, Agent, or Firm* — Lathrop GPM LLP

(57) ABSTRACT

The present disclosure provides a method for measuring a sensing range of a vehicle, a device and a medium, and relates to a technical field of automatic driving. The method includes: determining a target road side unit to be measured according to a road side unit identifier; when it is detected that the vehicle receives a road-side message from the target road side unit, determining vehicle positioning information of the vehicle when the road-side message is received; and determining a sensing range of the vehicle to the target road side unit in a target lane in which the vehicle travels according to the vehicle positioning information.

15 Claims, 3 Drawing Sheets

(51) Int. Cl.
  *G01S 11/02* (2010.01)
  *G08G 1/0962* (2006.01)

(56) References Cited

U.S. PATENT DOCUMENTS

2018/0310242 A1* 10/2018 Konishi ........... G08G 1/096716
2019/0222652 A1* 7/2019 Graefe ................. H04W 84/18

FOREIGN PATENT DOCUMENTS

JP      2018182661 A    11/2018
KR       101915363 B1    1/2019

OTHER PUBLICATIONS

Japanese Patent Application No. 2020-117635, Office Action dated Jun. 29, 2021, 3 pages.
Japanese Patent Application No. 2020-117635, English translation of Office Action dated Jun. 29, 2021, 3 pages.

* cited by examiner

METHOD FOR MEASURING SENSING RANGE OF VEHICLE, DEVICE AND MEDIUM

CROSS-REFERENCE TO RELATED APPLICATION

This application claims priority to and benefits of Chinese Patent Application Serial No. 201910944409.1, filed with the State Intellectual Property Office of P. R. China on Sep. 30, 2019, the entire content of which is incorporated herein by reference.

TECHNICAL FIELD

The present disclosure relates to a computer technology field, particularly relates to an automatic driving technology field, and more particularly, to a method for measuring a sensing range of a vehicle, a device and a medium.

BACKGROUND

With the rapid development of intelligent networking technology, V2I (Vehicle to Infrastructure) communication technology is gradually integrated in automatic driving vehicles to realize wireless information interaction between vehicle terminals and infrastructures.

RSU (Road Side Unit) communication is affected by installation location and installation environment of the RSU, thus communication distance changes according to scene changes such as increased equipment interference nearby, software update iteration, and the like.

SUMMARY

An embodiment of the present disclosure provides a method for measuring a sensing range of a vehicle. The method includes: determining a target road side unit to be measured according to a road side unit identifier; when it is detected that the vehicle receives a road-side message from the target road side unit, determining vehicle positioning information of the vehicle when the road-side message is received; and determining a sensing range of the vehicle to the target road side unit in a target lane in which the vehicle travels according to the vehicle positioning information.

An embodiment of the present disclosure provides an electronic device, includes: at least one processor; and a memory coupled in communication with the at least one processor; in which, the memory stores instructions executable by the at least one processor, and when the instructions are executed by the at least one processor, the at least one processor is caused to implement the method for measuring a sensing range of a vehicle according to any one of the embodiments of the present disclosure.

An embodiment of the present disclosure provides a non-transitory computer-readable storage medium storing computer instructions thereon. When the computer instructions executed by a computer, cause the computer to implement the method for measuring a sensing range of a vehicle according to any one of the embodiments of the present disclosure.

BRIEF DESCRIPTION OF THE DRAWINGS

The drawings are used to better understand the solution of the present disclosure, and do not constitute a limitation on the present disclosure, in which.

DETAILED DESCRIPTION

Exemplary embodiments of the present disclosure are described below with reference to the accompanying drawings, which include various details of the embodiments of the present disclosure to facilitate understanding, and should be considered as merely exemplary. Therefore, it is noted for those of ordinary skilled in the art that various changes and modifications can be made to the embodiments described herein without departing from the scope and spirit of the disclosure. Also, for clarity and conciseness, descriptions of well-known functions and structures are omitted in the following description.

With the rapid development of intelligent networking technology, V2I (Vehicle to Infrastructure) communication technology is gradually integrated in automatic driving vehicles to realize wireless information interaction between vehicle terminals and infrastructures.

RSU (Road Side Unit) communication is affected by installation location and installation environment of the RSU, thus communication distance changes according to scene changes such as increased equipment interference nearby, software update iteration, and the like. Therefore, in the related art, it is difficult to sense the action range of the RSU in real time to assist vehicle driving based on a preset fixed communication range, thereby reducing communication efficiency and accuracy between the vehicle and the RSU, and affecting the safe driving of automatic driving vehicles.

Thus, embodiments of the present disclosure proved a method for measuring a sensing range of a vehicle, an electronic device, and a non-transitory computer-readable storage medium.

Embodiment 1

Figure 1:
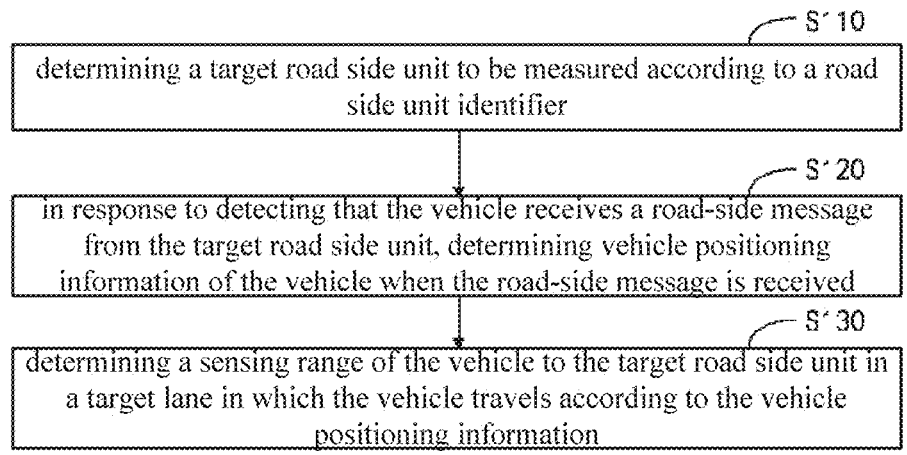
FIG. 1 is a flowchart of a method for measuring a sensing range of a vehicle according to Embodiment 1 of the present disclosure.

FIG. 1 is a flowchart of a method for measuring a sensing range of a vehicle according to Embodiment 1 of the present disclosure. This embodiment may be applicable to a situation of measuring a sensing range of the vehicle to a road side unit. The method may be executed by an apparatus for measuring a sensing range of a vehicle, which is implemented in a software and/or hardware manner, and may be configured in an electronic device to be configured. As illustrated in FIG. 1, the method includes the following steps.

At block S110, a target road side unit to be measured is determined according to a road side unit identifier.

In an embodiment of the present disclosure, the road side unit refers to a device installed on the roadside, and communicates with an on-board unit (OBU) of an automatic driving vehicle, so as to transmit information such as environment collected by the road side unit to the automatic driving vehicle to assist safe driving of the automatic driving vehicle. Correspondingly, a plurality of road side units are installed on the roadside in advance, and each road side unit has a road side unit identifier for uniquely identifying each road side unit.

In an embodiment, a message sent by the road side unit is a road-side message. The road-side message may include transmitted data content, such as the environmental information sensed by the road side unit, and may also include a road side unit identifier, which is configured to identify an issuer of the road-side message.

In an embodiment, the target road side unit refers to a target object to be measured in the vehicle's sensing range. The target road side unit may be a specific road side unit determined in advance. Alternatively, the target road side unit may be determined according to the received road-side message during the measurement process, the target road side unit being a road side unit to which a road-side message having a road side unit identifier same with the received road-side message belongs.

For example, a road side unit whose road side unit identifier is A may be pre-determined as the target road side unit. It can also be assumed that the current vehicle can currently receive road-side messages from road side units whose road side unit identifiers are A, B, and C. Based on the road side unit identifiers in the received road-side messages, the road side units whose road side unit identifiers are A, B, and C may be determined as the target road side units.

At block S120, when it is detected that the vehicle receives a road-side message from the target road side unit, positioning information of the vehicle when the road-side message is received is determined.

In an embodiment of the present disclosure, the road side unit may perform road-side message transmission in a broadcast mode or a point-to-point transmission mode. Correspondingly, the vehicle detects the received message in real time. When it is detected that the received message is a road-side message, and in response to determining that the received road-side message belongs to the target road side unit according to the road side unit identifier in the received road-side message, the vehicle positioning information when the vehicle receives the road-side message is determined by a positioning module in the automatic driving vehicle.

For example, the target road side unit broadcasts a road-side message every 5 s, and each time the vehicle receives a road-side message sent from the target road side unit, a vehicle positioning is performed to determine the vehicle positioning information when the vehicle receives the road-side message.

At block S130, a sensing range of the vehicle to the target road side unit in a target lane in which the vehicle travels is determined according to the vehicle positioning information.

In an embodiment of the present disclosure, the vehicle in different lanes may have different sensing ranges for a same road side unit. Therefore, in this embodiment, the sensing range is limited to a specific lane to improve the accuracy of the sensing range measurement. In detail, when the vehicle travels in a lane, the vehicle's capability to receive the road-side message sent from the target road side unit has boundaries.

Correspondingly, in this embodiment, the sensing range of vehicle to the target road side unit in the driving lane is determined according to the vehicle positioning information when the vehicle receives the road-side message from the target road side unit.

For example, a position (also called a first receiving position) where the vehicle receives a road-side message from the target road side unit for the first time and a position (also called a last receiving position) where the vehicle receives a road-side message from the target road side unit for the last time may be determined according to the position of the vehicle when the vehicle receives each road-side message from the target road side unit, changes in a distance between the target road side unit and the vehicle, and a driving direction in the driving lane of the vehicle. Alternatively, the first receiving position and the last receiving position may also be determined according to receiving time when the vehicle receives the road-side message from the target road side unit. The first receiving position and the last receiving position are a start and an end of the vehicle's capability to receive the road-side message from the target road side unit respectively. Thus, the sensing range of the vehicle to the target road side unit in the target lane is determined by taking the first receiving position and the last receiving position as boundaries.

In the embodiment, after the sensing range of the vehicle to the target road side unit is measured, the real-time sensed action range of the vehicle to the target road side unit can be compared with a historically-sensed action range. When the sensing range changes, for example, when the sensing range is reduced, it means that the target road side unit's assistance to the vehicle is reduced, and then a vehicle warning prompt is initiated in time to inform the vehicle that the action range of sensing the target road side unit has changed, so that automatic driving measurement may be modified to improve the safety of automatic driving vehicles.

In the embodiment, in a V2I (Vehicle to Infrastructure) scenario, for the received road-side messages, the road side unit to which each road-side message belongs is distinguished according to the road side unit identifier, and the vehicle positioning information when the vehicle receives the road-side message is recorded in real time, so that the sensing range of the vehicle to a specific road side unit is determined based on the vehicle positioning information. Therefore, a traditional way of passively receiving road-side messages of automatic driving vehicles is changed into actively sensing the action range of the road side units to avoid neglecting the sensing range changing with time, which provides a basis for reliable operation of automatic driving vehicles on specific road sections, thereby improving the safety of the automatic driving vehicles.

Embodiment 2

Figure 2:
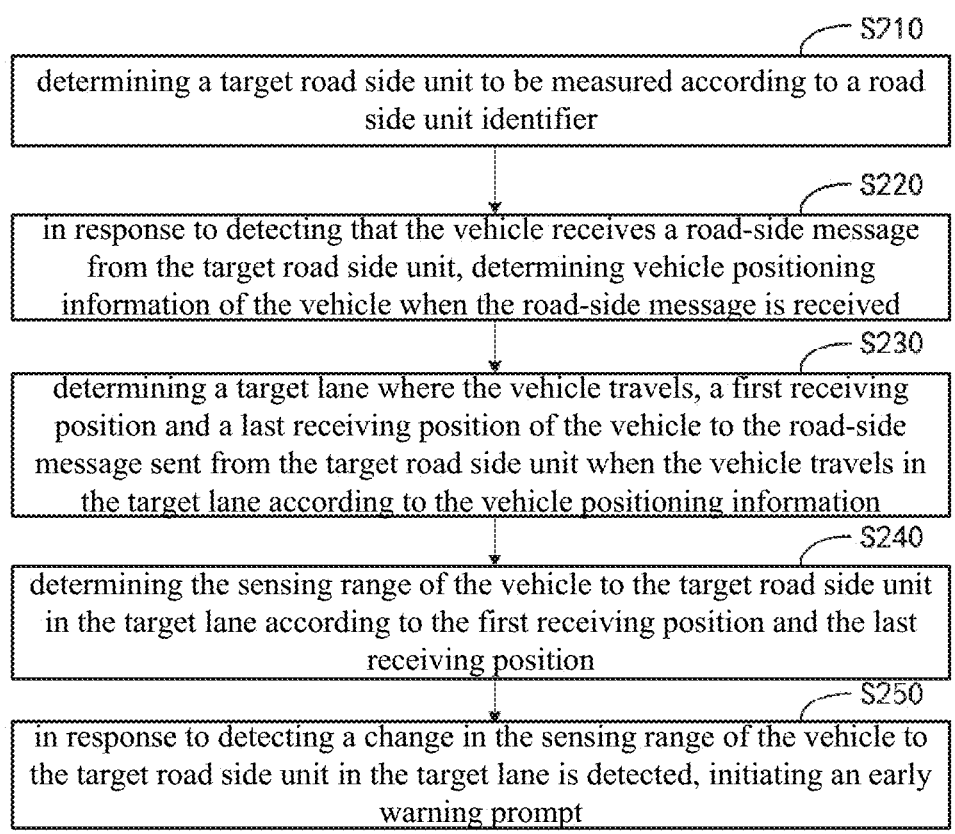
FIG. 2 is a flowchart of a method for measuring a sensing range of a vehicle according to Embodiment 2 of the present disclosure.

FIG. 2 is a flowchart of a method for measuring a sensing range of a method for measuring a sensing range of a vehicle according to Embodiment 2 of the present disclosure.

Based on Embodiment 1 described above, this embodiment further explains the sensing range measurement, and can determine the sensing range of the vehicle to the target road side unit according to the first receiving position and the last receiving position of the vehicle where the vehicle receives the road-side message from the target road side unit. As illustrated in FIG. 2, the method includes the following steps.

At block S210, a target road side unit to be measured is determined according to a road side unit identifier.

At block S220, when it is detected that the vehicle receives a road-side message from the target road side unit, positioning information of the vehicle when the road-side message is received is determined.

At block S230, a target lane where the vehicle travels, a first receiving position and a last receiving position of the vehicle to the road-side message sent from the target road side unit when the vehicle travels in the target lane are determined according to the vehicle positioning information.

In an embodiment of the present disclosure, since each lane is pre-planned and counted in a map, the target lane in which the vehicle currently travels may be determined according to the vehicle positioning information and the position of each lane in the map. Furthermore, according to the positioning information in the target lane of the vehicle, the first receiving position and the last receiving position of the vehicle to the road-side message sent from the target road side unit are determined. It can be understood that the first receiving position refers to the position information when the vehicle receives the road-side message from the target road side unit in the target lane for the first time. The last receiving position refers to the position information when the vehicle receives the road-side message from the target road side unit in the target lane for the last time. The first receiving position and the last receiving position in the target lane define the current sensing range of the vehicle to the target road side unit.

Alternatively, a real-time distance between the vehicle in the target lane and the target road side unit is determined based on the vehicle positioning information and the position information of the target road side unit. The first receiving position and the last receiving position of the vehicle in the target lane to the road-side message from the target road side unit are determined according to changes of the real-time distance and a driving direction in the target lane of the vehicle.

In the embodiment, an installation position of the road side unit on the road is fixed, and the position information of the road side unit can be determined in advance. Correspondingly, the road-side message may further include the position information of the road side unit. Alternatively, an association relation between the road side unit identifier and the position information of the road side unit may be pre-established, and the association relation may be pre-stored in the vehicle end or the cloud for vehicle to obtain and to use based on the road side unit identifier when measuring the sensing range.

In the embodiment, the target road side unit may be used as a reference point, and the real-time distance between the vehicle and the target road side unit is determined, each time the vehicle receives the road-side message from the target road side unit, based on the position information of the vehicle when the vehicle receives the road-side message from the road side unit. The vehicle is in a driving state in the target lane, and the vehicle regularly receives road-side messages from the target road side unit. Therefore, the real-time distance between the vehicle and the target road side unit may change each time the vehicle receives a road-side message. Furthermore, according to the change of the real-time distance and the driving direction in the target lane, the first receiving position and the last receiving position of the vehicle to the road-side message from the target road side unit in the target lane can be determined.

For example, when the vehicle travels in the driving direction in the target lane, if the real-time distance gets smaller and smaller, it means that the vehicle is approaching the target road side unit. The first receiving position refers to the vehicle positioning information when the vehicle receives the road-side message from the target road side unit for the first time in the target lane. If the real-time distance gets larger and larger, it means that the vehicle drives away from the target road side unit, and the vehicle is about to pass the last receiving position during the driving process. Thus, the vehicle positioning information when the vehicle receives the road-side message from the target road side unit for the last time in the target lane is determined as the last receiving position.

Alternatively, when the vehicle travels in the target lane, the first receiving position and the last receiving position of the vehicle to the road-side message from the target road side unit are determined according to the receiving time when the vehicle receives the road-side message from the target road side unit.

In the embodiment, when the road-side message is received, the receiving time of the road-side message may also be recorded. The time of receiving the road-side message from the target road side unit is listed in order, so that when the vehicle drives in the target lane, the position information recorded when the vehicle receives the road-side message from the target road side unit in the target lane for the first time is determined as the first receiving position, and the position information recorded when the vehicle receives the road-side message from the target road side unit for the last time in the target lane is determined as the last receiving position.

At block S240, the sensing range of the vehicle to the target road side unit in the target lane is determined according to the first receiving position and the last receiving position.

In an embodiment of the present disclosure, when the vehicle travels in the target lane, the first receiving position and the last receiving position for the road-side messages sent from the target road side unit are respectively determined as the start and end boundaries of the sensing range of the vehicle to the target road side unit in the target lane. The sensing range of the vehicle to the target road side unit in the target lane is determined by taking the first receiving position and the last receiving position as the boundaries. The sensing range can be expressed by position information such as coordinates. For example, in the target lane, the range between position coordinate A to coordinate B is the sensing range. Alternatively, the sensing range can also be expressed by distance information. For example, in a section where the vehicle drives away from the target road side unit in the target lane, a range of 100 meters away from the target road side unit is the sensing range.

Alternatively, in the target lane, the target road side unit is used as a cut-off point, and the target lane is divided into two sub-road sections. Based on the first receiving position and the position information of the target road side unit, a sensing distance to the target road side unit of the vehicle in the sub-road section where the first receiving position is located is determined. Based on the last receiving position and the position information of the target road side unit, a sensing distance to the target road side unit of the vehicle in the sub-road section where the last receiving position is located is determined.

In an embodiment, the target road side unit usually transmits the road-side message centered on itself. Therefore, in order to improve the measuring accuracy of the sensing range, when measuring the sensing range of the vehicle to the target road side unit in the target lane, the target road side unit can be used as the cutoff point to divide the target lane into two sub-road sections. That is, one is a first road section for the vehicle to approach the target road side unit, and the other is a second road section for the vehicle to drive away from the target road side unit. Accordingly, the first receiving position may be located in the first road section, and the last receiving position may be located in the second road section. Thus, a range between the first receiving position and the position information of the target road side unit is determined as the sensing range of vehicle to the target road side unit in the first road section. Alternatively, a distance from the first receiving position along the target lane to the position of the target road side unit is determined as the vehicle's sensing distance to the target road side unit in the first section. A range between the last receiving position and the position information of the target road side unit is determined as the sensing range of the vehicle to the target road side unit in the second road section. Alternatively, a distance from the position of the target road side unit along the target lane to the last receiving position is determined as the sensing distance of the vehicle to the target road side unit in the second road section.

Figure 3:
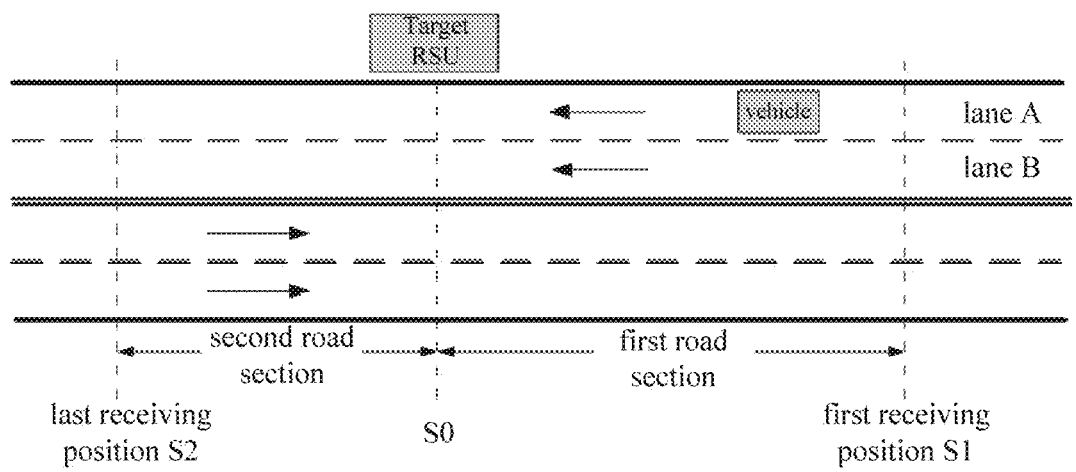
FIG. 3 is a schematic diagram of determining a sensing range according to Embodiment 2 of the present disclosure.

For example, FIG. 3 is an example diagram of determining a sensing range. As illustrated in FIG. 3, according to the positioning information of the vehicle, lane A is determined as the target lane. Assuming that, in the target lane, the first receiving position of the vehicle receiving the road-side message from the target RSU for the first time is S1, and the last receiving position of the vehicle receiving the road-side message from the target RSU for the last time is S2. It can be determined that the sensing range of the vehicle to the target RSU in the target lane is from position S1 to position S2. It is assumed that the position of the target RSU is S0, and the target lane is divided into a first road section and a second road section with the position of the target RSU as a cutoff point. Then, it can be determined that the sensing range for the target RSU in the first road section is from position S0 to position S1, and the sensing range for the target RSU in the second road section is from position S0 to position S2. Alternatively, the sensing distance of the vehicle to the target RSU in the first road section is |S1−S0|, and the sensing distance of the vehicle to the target RSU in the second road section is |S2−S0|.

Alternatively, if it is detected that at least one intersection exists in the target lane according to a road network topology, the target lane is divided into at least two sub-road sections by taking the at least one intersection as at least one cutoff point respectively. A sensing range of the vehicle to the target road side unit in each sub-road section of the target lane is determined according to the vehicle positioning information.

In an embodiment, in order to improve the measuring accuracy of the sensing range, when there is at least one intersection in the target lane, it is also possible to determine the sensing range of the vehicle to the target road side unit in each sub-road section with each intersection as a cutoff point.

Figure 4:
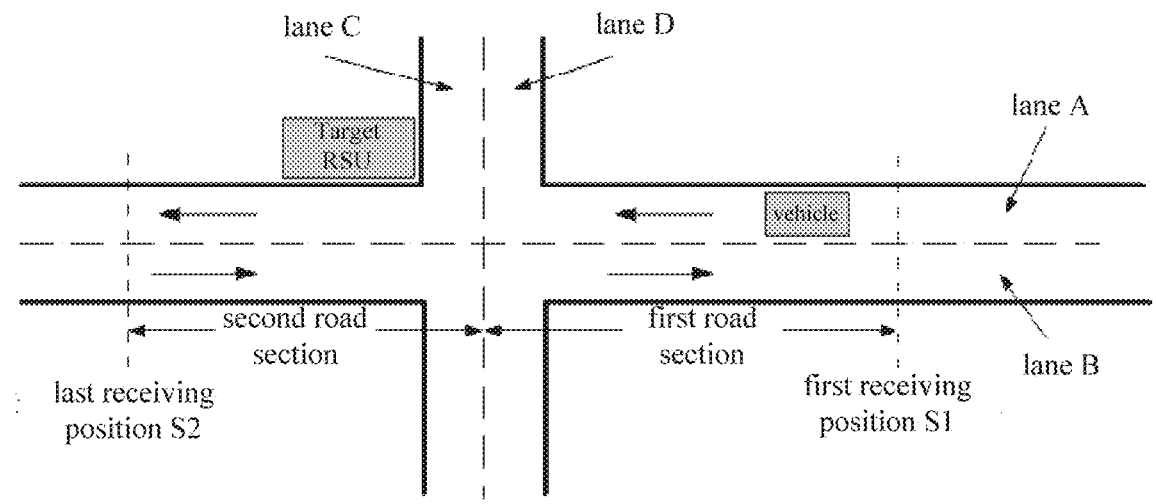
FIG. 4 is another schematic diagram of determining a sensing range according to Embodiment 2 of the present disclosure.

For example, FIG. 4 is another example diagram of determining a sensing range. As illustrated in FIG. 4, lane A is determined as the target lane according to the vehicle positioning information. Assuming that, in the target lane, the first receiving position of the vehicle receiving the road-side message from the target RSU for the first time is S1, and the last receiving position of the vehicle receiving the road-side message from the target RSU for the last time is S2. It can be determined that the sensing range of the vehicle to the target RSU in the target lane is from position S1 to position S2. Assuming that there is an intersection in the target lane, and position of the intersection is S0, the target lane is divided into a first road section and a second road section using the intersection as a cutoff point. It may be determined that the sensing range of the vehicle to the target RSU in the first road section is from position S0 to position S1, and the sensing range of the vehicle to the target RSU in the second road section is from position S0 to position S2.

At block S250, when a change in the sensing range of the vehicle to the target road side unit in the target lane is detected, an early warning prompt is initiated.

In an embodiment of the present disclosure, after the sensing range of the vehicle to the target road side unit is measured, the real-time sensing range of the vehicle to the target road side unit can be compared with a historically-sensed action range. If a change in the sensing range is detected, for example, the sensing range is reduced, it means that the target road side unit's assistance capability to the vehicle is reduced, and then the vehicle warning prompt is initiated in time to inform the vehicle that the action range of the target road side unit changes, so that the measurement of automatic driving may be modified to improve the safety of automatic driving vehicles.

In the embodiment, in a V2I scenario, for the received road-side message, the road side unit to which each road-side message belongs is distinguished according to the road side unit identifier, the vehicle positioning information when the vehicle receives the road-side message is recorded in real time, the target lane where the vehicle drives, the first receiving position and the last receiving position of the vehicle to the road-side message from the road side unit when the vehicle drives in the target lane are determined, so that the vehicle's sensing range for a specific road side unit is determined based on the first receiving position and the last receiving position. Therefore, a traditional way of passively receiving road-side messages of automatic driving vehicles is changed into actively sensing the action range of the road side units to avoid neglecting the sensing range changing with time, which provides a basis for reliable operation of automatic driving vehicles on specific road sections, thereby improving the safety of the automatic driving vehicles.

Embodiment 3

Figure 5:
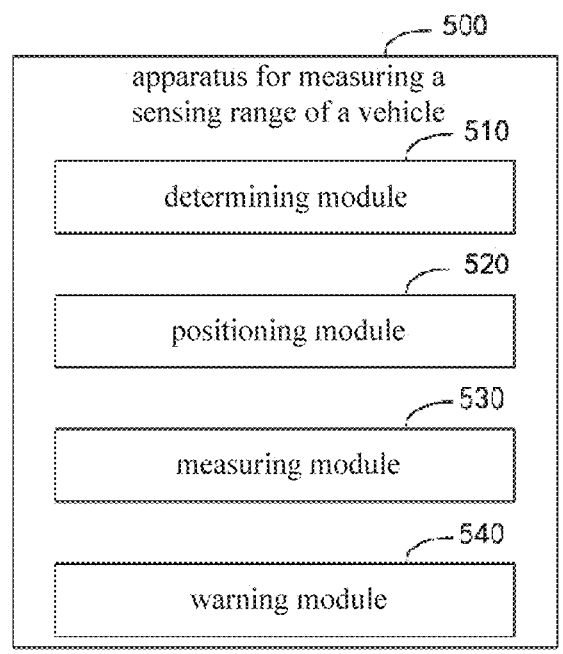
FIG. 5 is a block diagram of an apparatus for measuring a sensing range of a vehicle according to Embodiment 3 of the present disclosure.

FIG. 5 is a block diagram of an apparatus for measuring a sensing range of a vehicle according to Embodiment 3 of the present disclosure. This embodiment is applicable to a case where a vehicle measures a sensing range for a road side unit, and the device can implement the method for measuring a sensing range of a vehicle described in any embodiment of the present disclosure. The device 500 specifically includes a determining module 510, a positioning module 520 and a measuring module 530.

The determining module 510 is configured to determine a target road side unit to be measured according to a road side unit identifier;

The vehicle positioning module 520 is configured to, when it is detected that the vehicle receives a road-side message from the target road side unit, determine vehicle positioning information of the vehicle when the road-side message is received; and The sensing range measuring module 530 is configured to determine a sensing range of the vehicle to the target road side unit in a driving lane in which the vehicle travels according to the vehicle positioning information.

Alternatively, the sensing range measuring module 530 is configured to:

determine a target lane where the vehicle travels, a first receiving position and a last receiving position of the vehicle to the road-side message sent from the target road side unit when the vehicle travels in the target lane according to the vehicle positioning information; and determine the sensing range of the vehicle to the target road side unit in the target lane according to the first receiving position and the last receiving position.

Alternatively, the sensing range measuring module 530 is configured to:

determine a real-time distance between the vehicle in the target lane and the target road side unit according to the vehicle positioning information and position information of the target road side unit; and determine the first receiving position and the last receiving position of the vehicle to the road-side message sent from the target road side unit when the vehicle travels in the target lane according to changes of the real-time distance and a driving direction in the target lane of the vehicle.

Alternatively, the sensing range measuring module 530 is configured to determine the first receiving position and the last receiving position of the vehicle to the road-side message sent from the target road side unit when the vehicle travels in the target lane according to receiving time when the vehicle receives the road-side message from the target road side unit.

Alternatively, the sensing range measuring module 530 is configured to:

divide the target lane into two sub-road sections by taking the target road side unit as a cutoff point;

determine a sensing distance to the target road side unit of the vehicle in the sub-road section where the first receiving position is located according to the first receiving position and position information of the target road side unit; and determine a sensing distance to the target road side unit of the vehicle in the sub-road section where the last receiving position is located according to the last receiving position and the position information of the target road side unit.

Alternatively, the sensing range measuring module 530 is configured to:

when it is detected that at least one intersection exists in the target lane according to a road network topology, divide the target lane into at least two sub-road sections by taking the at least one intersection as at least one cutoff point respectively; and determine a sensing range of the vehicle to the target road side unit in each sub-road section of the target lane according to the vehicle positioning information.

Furthermore, the device further includes a warning module 540. After the measuring module 530 determines the sensing range of the vehicle to the target road side unit in the target lane in which the vehicle travels according to the vehicle positioning information, the warning module 540 is configured to initiate an early warning prompt when a change in the sensing range of the vehicle to the target road side unit in the target lane is detected.

With the technical solution of this embodiment, through the cooperation between respective functional modules, functions such as determination of the target road side unit, reception of the road-side message, identification of road side unit identifier, positioning of the vehicle, and determination of the sensing range and the early warning are realized. Therefore, a traditional way of passively receiving road-side messages of automatic driving vehicles is changed into actively sensing action range of the road side units to avoid neglecting sensing ranges road side unit time, which provides a basis for reliable operation of automatic driving vehicles on specific road sections, thereby improving the safety of the automatic driving vehicles.

Embodiment 4

According to an embodiment of the present disclosure, the present disclosure further provides an electronic device and a readable storage medium.

Figure 6:
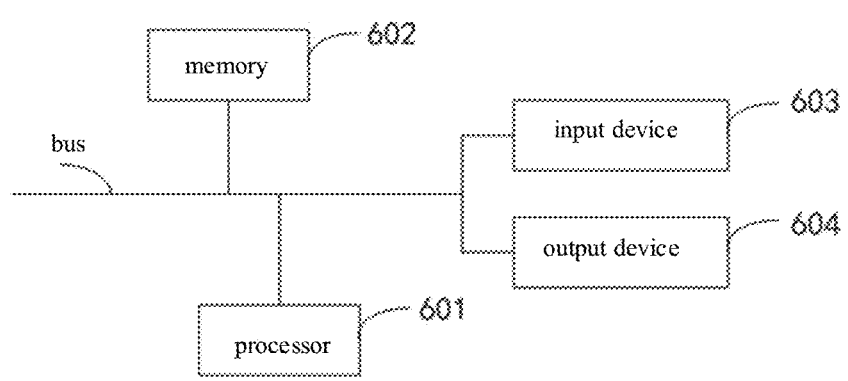
FIG. 6 is a block diagram of an electronic device for implementing a method for measuring a sensing range of a vehicle according to an embodiment of the present disclosure.

FIG. 6 is a block diagram of an electronic device for implementing a method for measuring a sensing range of a vehicle according to any embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital assistants, cellular phones, smart phones, wearable devices, and other similar computing devices. The components shown here, their connections and relations, and their functions are merely examples, and are not intended to limit the implementation of the disclosure described and/or required herein.

As illustrated in FIG. 6, the electronic device includes: one or more processors 601, a memory 602, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI (Graphical User Interface) on an external input/output device such as a display device coupled to the interface. In other embodiments, a plurality of processors and/or a plurality of buses can be used with a plurality of memories and a plurality of processors, if desired. Similarly, a plurality of electronic devices can be connected, each providing some of the necessary operations (for example, as a server array, a group of blade servers, or a multiprocessor system). A processor 601 is taken as an example in FIG. 6.

The memory 602 is a non-transitory computer-readable storage medium according to the present disclosure. The memory stores instructions executable by at least one processor, so that the at least one processor executes the method for measuring a sensing range of a vehicle according to the present disclosure. The non-transitory computer-readable storage medium of the present disclosure stores computer instructions, which are used to cause a computer to execute the method for measuring a sensing range of a vehicle according to the present disclosure.

As a non-transitory computer-readable storage medium, the memory 602 is configured to store non-transitory software programs, non-transitory computer executable programs and modules, such as program instructions/modules corresponding to the method for measuring a sensing range of a vehicle in the embodiment of the present disclosure, such as the determining module 510, the positioning module 520, the measuring module 530, and the waring module 540 shown in FIG. 5. The processor 601 executes various functional applications and data processing of the server by running non-transitory software programs, instructions, and modules stored in the memory 602, that is, implementing the method for measuring a sensing range of a vehicle in the foregoing method embodiment.

The memory 602 may include a program storage area and a data storage area, where the program storage area may store an operating system and an application required for at least one function. The data storage area may store data created according to the use of the electronic device, and the like. In addition, the memory 602 may include a high-speed random access memory, and a non-transitory memory, such as at least one magnetic disk storage device, a flash memory device, or other non-transitory solid-state storage device. In some embodiments, the memory 602 may optionally include a memory remotely disposed with respect to the processor 601, and these remote memories may be connected to the electronic device through a network. Examples of the above network include, but are not limited to, the Internet, an intranet, a local area network, a mobile communication network, and combinations thereof.

The electronic device for a method for measuring a sensing range of a vehicle may further include an input device 603 and an output device 604. The processor 601, the memory 602, the input device 603, and the output device 604 may be connected through a bus or in other manners. In FIG. 6, the connection through the bus is taken as an example.

The input device 603 may receive inputted numeric or character information, and generate key signal inputs related to user settings and function control of the electronic device, such as a touch screen, a keypad, a mouse, a trackpad, a touchpad, an indication rod, one or more mouse buttons, trackballs, joysticks and other input devices. The output device 604 may include a display device, an auxiliary lighting device (for example, a Light Emitting Diode (LED)), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be a dedicated or general purpose programmable processor that can receive data and instructions from a storage system, at least one input device, and at least one output device, and can transmit the data and instructions to the storage system, the at least one input device, and the at least one output device.

These computing programs (also known as programs, software, software applications, or codes) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, equipment, and/or device used to provide machine instructions and/or data to a programmable processor (for example, magnetic disks, optical disks, memories, programmable logic devices (PLDs), including machine-readable media that receives machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor) for displaying information to a user, a keyboard and a pointing device (such as a mouse or a trackball) through which the user can provide input to the computer. Other kinds of devices may also be used to provide interaction with the user. For example, the feedback provided to the user may be any form of sensor feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or be implemented in a computing system that includes middleware components (for example, an application server), or be implemented in a computing system that includes front-end components (for example, a user computer with a graphical user interface or a web browser, through which the user can interact with the implementation of the systems and technologies described herein), or be implemented in a computing system that includes such background components, middleware components, front-end components or any combination thereof. The components of the system may be interconnected by any form or medium of digital data communication (e.g., a communication network). Examples of communication networks include: a local area network (LAN), a wide area network (WAN), and the Internet.

The computer system may include a client and a server. The client and the server are generally remote from each other and interact with each other through a communication network. The client-server relation is generated by computer programs running on the respective computers and having a client-server relation with each other.

With embodiments of the present disclosure, a traditional way of passively receiving road-side messages of automatic driving vehicles is changed into actively sensing the action range of the road side units to avoid neglecting sensing range changing with time, which provides a basis for reliable operation of automatic driving vehicles on specific road sections, thereby improving the safety of the automatic driving vehicles.

In addition, the embodiment of the present disclosure has the following advantages or beneficial effects. By detecting the first receiving position and the last receiving position of the vehicle to the road-side message sent from the target road side unit, the boundaries of the vehicle's sensing range for the target road side unit can be determined, which facilitates determining the vehicle's sensing range in each lane.

In addition, the embodiment of the present disclosure has the following advantages or beneficial effects. The first receiving position and the last receiving position of the vehicle to the road-side message sent from the target road side unit is determined according to the real-time distance between the target road side unit and the vehicle when the vehicle receives the road-side message and a driving direction in the lane of the vehicle.

In addition, the embodiment of the present disclosure has the following advantages or beneficial effects. The first receiving position and the last receiving position of the vehicle to the road-side message sent from the target road side unit may be determined according to the receiving time of the road-side message sent from the same road side unit.

In addition, the embodiment of the present disclosure has the following advantages or beneficial effects. By taking the target road side unit as a cutoff point, it is possible to determine the sensing range of the vehicle to the target road side unit in each section of the target lane, and to improve the accuracy of determining the sensing range.

In addition, the embodiment of the present disclosure has the following advantages or beneficial effects. By taking an intersection as a cutoff point, it is possible to determine the sensing range of the vehicle to the target road side unit in each section of the target lane, and to improve the accuracy of determining the sensing range.

In addition, the embodiment of the present disclosure has the following advantages or beneficial effects. Based on the measured sensing range, when a change in the sensing range of the vehicle to the target road side unit in the target lane is detected, an early warning prompt is initiated for the automatic driving vehicle in a certain road section, to improve driving safety of the vehicle.

It should be understood that the various forms of processes shown above can be used to reorder, add, or delete steps. For example, the steps described in this application can be executed in parallel, sequentially, or in different orders, as long as the desired results of the technical solutions disclosed in this application can be achieved, which is not limited herein.

The foregoing specific implementations do not constitute a limitation on the protection scope of the present application. It should be understood by those skilled in the art that various modifications, combinations, sub-combinations, and substitutions may be made according to design requirements and other factors. Any modification, equivalent replacement and improvement made within the spirit and principle of this application shall be included in the protection scope of this application.

What is claimed is:

1. A method for measuring a sensing range of a vehicle, comprising:
   determining a target road side unit to be measured according to a road side unit identifier;
   in response to detecting that the vehicle receives a road-side message from the target road side unit, determining vehicle positioning information of the vehicle when the road-side message is received;
   determining a sensing range of the vehicle to the target road side unit in a target lane in which the vehicle travels according to the vehicle positioning information, the sensing range indicating a range of action of the target road side unit on the vehicle; and
   in response to detecting a change in the sensing range of the vehicle to the target road side unit in the target lane is detected, initiating an early warning prompt;
   wherein determining the sensing range of the vehicle to the target road side unit in the target lane in which the vehicle travels according to the vehicle positioning information comprising:
   when it is detected that at least one intersection exists in the target lane according to a road network topology, dividing the target lane into at least two sub-road sections by taking the at least one intersection as at least one cutoff point respectively; and
   determining a sensing range of the vehicle to the target road side unit in each sub-road section of the target lane according to the vehicle positioning information.

2. The method according to claim 1, determining the sensing range of the vehicle to the target road side unit in the target lane in which the vehicle travels according to the vehicle positioning information comprising:
   determining a target lane where the vehicle travels, a first receiving position and a last receiving position of the vehicle to the road-side message sent from the target road side unit when the vehicle travels in the target lane according to the vehicle positioning information; and
   determining the sensing range of the vehicle to the target road side unit in the target lane according to the first receiving position and the last receiving position.

3. The method according to claim 2, determining the first receiving position and the last receiving position of the vehicle to the road-side message sent from the target road side unit when the vehicle travels in the target lane according to the vehicle positioning information, comprising:
   determining a real-time distance between the vehicle in the target lane and the target road side unit according to the vehicle positioning information and position information of the target road side unit; and
   determining the first receiving position and the last receiving position of the vehicle to the road-side message sent from the target road side unit when the vehicle travels in the target lane according to changes of the real-time distance and a driving direction in the target lane of the vehicle.

4. The method according to claim 2, determining the first receiving position and the last receiving position of the vehicle to the road-side message sent from the target road side unit when the vehicle travels in the target lane according to the vehicle positioning information, comprising:
   determining the first receiving position and the last receiving position of the vehicle to the road-side message sent from the target road side unit when the vehicle travels in the target lane according to receiving time when the vehicle receives the road-side message from the target road side unit.

5. The method according to claim 2, determining the sensing range of the vehicle to the target road side unit in the target lane according to the first receiving position and the last receiving position, comprising:
   dividing the target lane into two sub-road sections by taking the target road side unit as a cutoff point;
   determining a sensing distance to the target road side unit of the vehicle in the sub-road section where the first receiving position is located according to the first receiving position and position information of the target road side unit; and
   determining a sensing distance to the target road side unit of the vehicle in the sub-road section where the last receiving position is located according to the last receiving position and the position information of the target road side unit.

6. An electronic device, comprising:
   at least one processor; and
   a memory coupled in communication with the at least one processor; wherein,
   the memory stores instructions executable by the at least one processor, and when the instructions are executed by the at least one processor, the at least one processor are caused to implement a method for measuring a sensing range of a vehicle, the method comprising:
   determining a target road side unit to be measured according to a road side unit identifier;
   in response to detecting that the vehicle receives a road-side message from the target road side unit, determining vehicle positioning information of the vehicle when the road-side message is received;
   determining a sensing range of the vehicle to the target road side unit in a target lane in which the vehicle travels according to the vehicle positioning information, the sensing range indicating a range of action of the target road side unit on the vehicle; and in response to detecting a change in the sensing range of the vehicle to the target road side unit in the target lane is detected, initiating an early warning prompt;

wherein determining the sensing range of the vehicle to the target road side unit in the target lane in which the vehicle travels according to the vehicle positioning information comprising:

when it is detected that at least one intersection exists in the target lane according to a road network topology, dividing the target lane into at least two sub-road sections by taking the at least one intersection as at least one cutoff point respectively; and determining a sensing range of the vehicle to the target road side unit in each sub-road section of the target lane according to the vehicle positioning information.

7. The electronic device according to claim 6, determining the sensing range of the vehicle to the target road side unit in the target lane in which the vehicle travels according to the vehicle positioning information comprising:

determining a target lane where the vehicle travels, a first receiving position and a last receiving position of the vehicle to the road-side message sent from the target road side unit when the vehicle travels in the target lane according to the vehicle positioning information; and determining the sensing range of the vehicle to the target road side unit in the target lane according to the first receiving position and the last receiving position.

8. The electronic device according to claim 7, determining the first receiving position and the last receiving position of the vehicle to the road-side message sent from the target road side unit when the vehicle travels in the target lane according to the vehicle positioning information, comprising:

determining a real-time distance between the vehicle in the target lane and the target road side unit according to the vehicle positioning information and position information of the target road side unit; and determining the first receiving position and the last receiving position of the vehicle to the road-side message sent from the target road side unit when the vehicle travels in the target lane according to changes of the real-time distance and a driving direction in the target lane of the vehicle.

9. The electronic device according to claim 7, determining the first receiving position and the last receiving position of the vehicle to the road-side message sent from the target road side unit when the vehicle travels in the target lane according to the vehicle positioning information, comprising:

determining the first receiving position and the last receiving position of the vehicle to the road-side message sent from the target road side unit when the vehicle travels in the target lane according to receiving time when the vehicle receives the road-side message from the target road side unit.

10. The electronic device according to claim 7, determining the sensing range of the vehicle to the target road side unit in the target lane according to the first receiving position and the last receiving position, comprising:

dividing the target lane into two sub-road sections by taking the target road side unit as a cutoff point;

determining a sensing distance to the target road side unit of the vehicle in the sub-road section where the first receiving position is located according to the first receiving position and position information of the target road side unit; and determining a sensing distance to the target road side unit of the vehicle in the sub-road section where the last receiving position is located according to the last receiving position and the position information of the target road side unit.

11. A non-transitory computer-readable storage medium, having computer instructions stored thereon that, when executed by a computer, cause the computer to implement a method for measuring a sensing range of a vehicle, the method comprising:

determining a target road side unit to be measured according to a road side unit identifier;

in response to detecting that the vehicle receives a road-side message from the target road side unit, determining vehicle positioning information of the vehicle when the road-side message is received;

determining a sensing range of the vehicle to the target road side unit in a target lane in which the vehicle travels according to the vehicle positioning information, the sensing range indicating a range of action of the target road side unit on the vehicle; and in response to detecting a change in the sensing range of the vehicle to the target road side unit in the target lane is detected, initiating an early warning prompt;

wherein determining the sensing range of the vehicle to the target road side unit in the target lane in which the vehicle travels according to the vehicle positioning information comprising:

when it is detected that at least one intersection exists in the target lane according to a road network topology, dividing the target lane into at least two sub-road sections by taking the at least one intersection as at least one cutoff point respectively; and determining a sensing range of the vehicle to the target road side unit in each sub-road section of the target lane according to the vehicle positioning information.

12. The storage medium according to claim 11, determining the sensing range of the vehicle to the target road side unit in the target lane in which the vehicle travels according to the vehicle positioning information comprising:

determining a target lane where the vehicle travels, a first receiving position and a last receiving position of the vehicle to the road-side message sent from the target road side unit when the vehicle travels in the target lane according to the vehicle positioning information; and determining the sensing range of the vehicle to the target road side unit in the target lane according to the first receiving position and the last receiving position.

13. The storage medium according to claim 12, determining the first receiving position and the last receiving position of the vehicle to the road-side message sent from the target road side unit when the vehicle travels in the target lane according to the vehicle positioning information, comprising:

determining a real-time distance between the vehicle in the target lane and the target road side unit according to the vehicle positioning information and position information of the target road side unit; and determining the first receiving position and the last receiving position of the vehicle to the road-side message sent from the target road side unit when the vehicle travels in the target lane according to changes of the real-time distance and a driving direction in the target lane of the vehicle.

14. The storage medium according to claim 12, determining the first receiving position and the last receiving position of the vehicle to the road-side message sent from the target road side unit when the vehicle travels in the target lane according to the vehicle positioning information, comprising:
- determining the first receiving position and the last receiving position of the vehicle to the road-side message sent from the target road side unit when the vehicle travels in the target lane according to receiving time when the vehicle receives the road-side message from the target road side unit.

15. The storage medium according to claim 12, determining the sensing range of the vehicle to the target road side unit in the target lane according to the first receiving position and the last receiving position, comprising:
- dividing the target lane into two sub-road sections by taking the target road side unit as a cutoff point;
- determining a sensing distance to the target road side unit of the vehicle in the sub-road section where the first receiving position is located according to the first receiving position and position information of the target road side unit; and
- determining a sensing distance to the target road side unit of the vehicle in the sub-road section where the last receiving position is located according to the last receiving position and the position information of the target road side unit.

* * * * *